United States Patent
Lee et al.

(10) Patent No.: US 9,787,548 B2
(45) Date of Patent: Oct. 10, 2017

(54) FAST SERVICE DISCOVERY METHOD AND APPARATUS IN DYNAMIC RESOURCE ENVIRONMENT USING HIERARCHICAL BLOOM FILTERS

(71) Applicant: AGENCY FOR DEFENSE DEVELOPMENT, Daejeon (KR)

(72) Inventors: Sangil Lee, Seoul (KR); Cheolmin Park, Seoul (KR); In-Young Ko, Daejeon (KR); Hyeon-Jun Jo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/193,244

(22) Filed: Jun. 27, 2016

(65) Prior Publication Data

US 2017/0149617 A1   May 25, 2017

(30) Foreign Application Priority Data

Nov. 19, 2015 (KR) ........................ 10-2015-0162749

(51) Int. Cl.
*H04L 12/24* (2006.01)
*H04L 29/08* (2006.01)

(52) U.S. Cl.
CPC .......... *H04L 41/12* (2013.01); *H04L 41/5054* (2013.01); *H04L 67/2852* (2013.01)

(58) Field of Classification Search
CPC ................. H04L 67/1097; H04L 67/10; H04L 29/06047; H04L 67/16; H04L 67/42; H04L 67/104; H04L 67/1095; H04L 12/18; H04L 41/12; H04L 5/0007; H04L 5/0032; H04L 5/0037; H04L 67/1061; H04L 67/1068; H04W 8/005; H04W 84/18; H04W 56/001; H04W 8/26; H04W 56/0015; H04W 52/0209; H04W 52/0216; H04W 68/02; H04J 3/0638; Y02B 60/50
See application file for complete search history.

(56) References Cited

U.S. PATENT DOCUMENTS

2015/0363704 A1* 12/2015 Yong ...................... H04L 67/16
706/46

FOREIGN PATENT DOCUMENTS

CN    104333591 A * 2/2015
KR    10-2007-0031154 A  3/2007

* cited by examiner

*Primary Examiner* — Patrice Winder
*Assistant Examiner* — Abderrahmen Chouat
(74) *Attorney, Agent, or Firm* — LRK Patent Law Firm

(57) ABSTRACT

Fast service discovery method and apparatus in a dynamic resource environment using hierarchical Bloom filters. The fast service discovery method includes when resources are discovered, hierarchically classifying the resources based on multiple levels, designing multiple hierarchical Bloom filters for respective pieces of level information to respectively correspond to the multiple levels, and transforming the resources into a resource coordinate system via the Bloom filters, and identifying an available service using the resource coordinate system.

8 Claims, 6 Drawing Sheets

FAST SERVICE DISCOVERY METHOD AND APPARATUS IN DYNAMIC RESOURCE ENVIRONMENT USING HIERARCHICAL BLOOM FILTERS

CROSS REFERENCE TO RELATED APPLICATION

This application claims the benefit of Korean Patent Application No. 10-2015-0162749 filed Nov. 19, 2015, the entire contents of which are incorporated herein by reference.

BACKGROUND OF THE INVENTION

1. Technical Field

The present invention generally relates to network technology and, more particularly, to a method and apparatus that enables services available at the corresponding time to be quickly detected using discovered resources in a distributed service execution environment.

2. Description of the Related Art

A technique for identifying an available service after detecting resources is referred to as a 'bottom-up technique'. In this case, a method for utilizing the specification of resources without change, upon handling information about resources at the current time, is used.

This method is disadvantageous in that a specification composed of long characters is used unchanged, and thus handling time is further increased and, a relatively large amount of network traffic occurs due to exchanged messages. Further, a technique for determining whether to use required resources using resource requirements for a desired service is referred to as a 'top-down technique'. A conventional method related to this has difficulty in representing substitute resources for resources required by the service.

Definite resources required by the service may be found using a resource specification, but the corresponding service must be able to be executed by searching for substitute resources capable of replacing the required resources. However, there is a disadvantage in that it is difficult to flexibly and simply search for substitute resources using only a resource specification that is the conventional method.

Therefore, there is a need to solve the problems of the conventional method, that is, a long processing time, a large amount of network traffic, and difficulty in detecting suitable substitute resources, in the procedure for detecting an available service using discovered resources and in the procedure for searching for substitute resources for resources required by each service.

SUMMARY OF THE INVENTION

Accordingly, the present invention has been made keeping in mind the above problems occurring in the prior art, and an object of the present, invention is to provide a fast service discovery method and apparatus, which can quickly identify an available service in a distributed service execution environment.

Another object of the present invention is to provide a method and apparatus for quickly discovering a service, and for quickly determining substitute resources for a service.

In accordance with an aspect of the present invention to accomplish the above objects, there is provided a fast service discovery method, which can quickly identify available services in a distributed service execution environment.

The fast service discovery method includes (a) when resources are discovered, hierarchically classifying the resources based on multiple levels; (b) designing multiple hierarchical Bloom filters for respective pieces of level information to respectively correspond to the multiple levels, and transforming the resources into a resource coordinate system via the Bloom filters; and (c) identifying, an available service using the resource coordinate system.

Here, the resources may have information about respective resource levels thereof, and a number of the multiple hierarchical Bloom filters may be identical to a number of the resource levels.

Further, (b) may include receiving, by each of the multiple hierarchical Bloom filters, a sentence as input; and transforming the sentence into the resource coordinate system by hashing the sentence using different hash functions of the corresponding hierarchical Bloom filter.

Furthermore, the hashing may be configured to transform the resources into coordinate values in the resource coordinate system using the following equation:

Resource Capability $A, \vec{V}_A = (\bar{p}_1, \bar{p}_2, \bar{p}_3, \ldots, \bar{p}_k)$ Bloom Filter of level $l, BF_l(A) = (i_{l,1}, i_{l,2}, i_{l,3}, \ldots, i_{l,k})$ $$D_l = \begin{cases} l = L, & D_l = 0 \\ l < L, & D_l = \sum_{j=l+1}^{L} d_j \end{cases}, \quad d_j = \text{Digit of } BF_j(A)$$

For $$\vec{V}_A, \bar{p}_k = \sum_{l=0}^{L} \{i_{l,k} \times 10^{D_l}\}$$

(where A: resource, $BF_j$: a hierarchical Bloom filter corresponding to resource level l, $D_l$: a number of digits of a maximum value of hash values of the hierarchical Bloom filter corresponding to resource level l, L: a lowermost level (number) of the resource levels, and $d_j$: digit of $BF_j(A)$).

Furthermore, the multiple hierarchical Bloom filters are configured such that a unique Bloom filter is used for each level for specification and level information of the resources, and a number of unique numbers identical to a number of hash functions are generated for each level for one resource.

Furthermore, each of the multiple hierarchical Bloom filters may have a predetermined number of hash functions, and the multiple hierarchical Bloom filters may have an identical number of hash functions.

The coordinate values may be transformed into positive integers, with the level information of the resources being included in the coordinate values via hashing, and hash values at all levels for respective types of hash functions form a single number in such a way that a hash value at a lower level is connected to a position subsequent to a hash value at a higher level.

Furthermore, the resource coordinate system may have a dimension corresponding to a number of hash functions, and may be configured such that the resources are transformed into coordinate values falling within unique areas depending on the level information and such that resources at an identical level are transformed into coordinate values falling within an identical area.

Respective services may require resources at different levels, and the corresponding service may be capable of being executed via resources belonging to a higher level regardless of lower levels when only the higher level is specified.

In accordance with another aspect of the present invention to accomplish the above objects, there is provided a fast service discovery apparatus in a dynamic resource environment using hierarchical Bloom filters, including a resource analysis module for, when resources are discovered, hierarchically classifying the resources based on multiple levels; a Bloom filter design module for designing multiple hierarchical Bloom filters for respective pieces of level information to respectively correspond to the multiple levels; a coordinate transformation module for transforming the resources into a resource coordinate system via the Bloom filters; and an identification module for identifying an available service using, the resource coordinate system.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
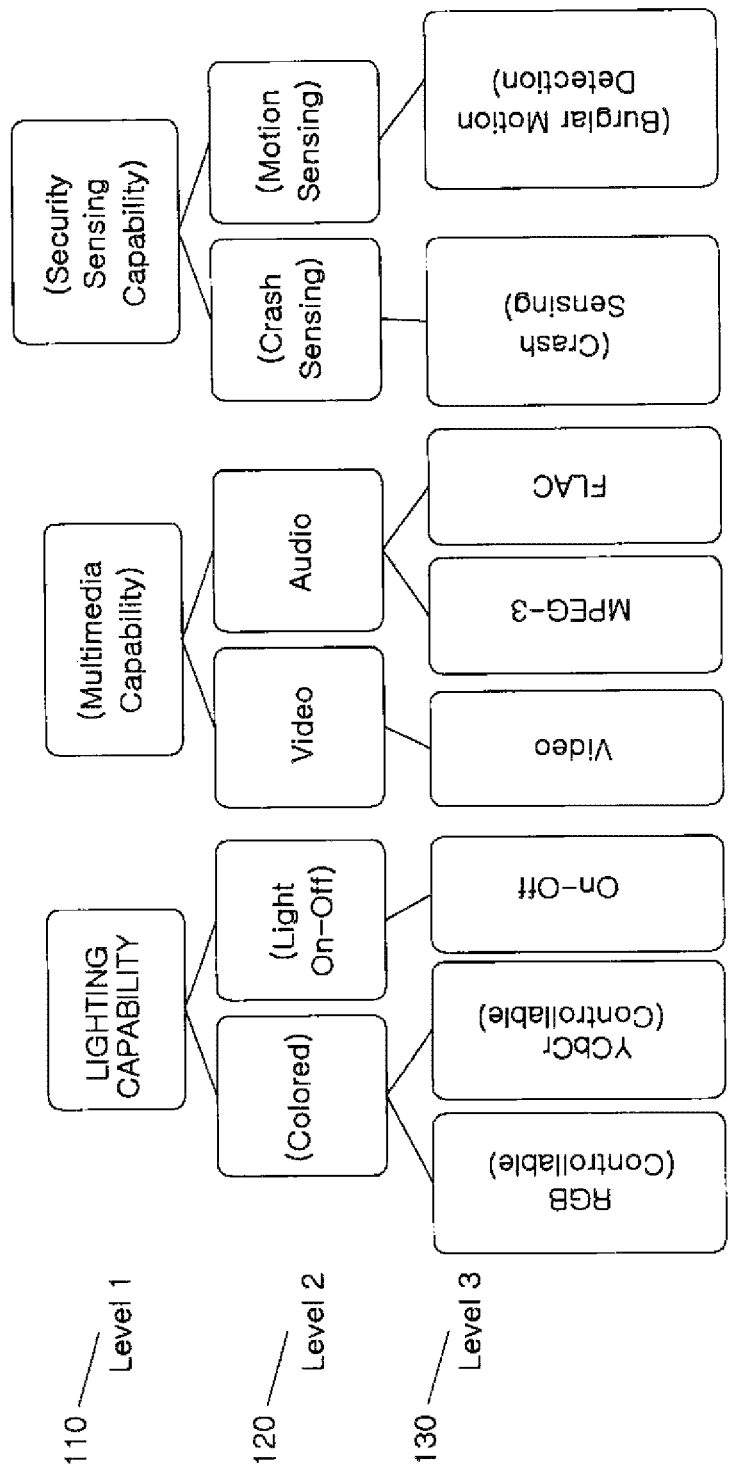
FIG. 1 is a conceptual diagram illustrating typical resource levels.

The present invention may be variously changed and may have various embodiments, and specific embodiments will be described in detail below with reference to the attached drawings. However, it should be understood that those embodiments are not intended to limit the present invention to specific disclosure forms and they include all changes, equivalents or modifications included in the spirit and scope of the present invention.

In the following description of the present invention, the same reference numerals are used to designate the same or similar elements throughout the drawings and repeated descriptions of the same components will be omitted.

The terms such as "first" and "second" may be used to describe various components, but those components should not be limited by the terms. The terms are merely used to distinguish one component from other components.

For example, a first component may be designated as a second component and a second component may be designated as a first component in the similar manner, without departing from the scope based on the concept of the present invention. Further, the term "and/or" includes a combination of a plurality of related items or any one of the plurality of related items.

Unless differently defined, all terms used here including technical or scientific terms have the same meanings as the terms generally understood by those skilled in the art to which the present invention pertains.

The terms identical to those defined in generally used dictionaries should be interpreted as having meanings identical to contextual meanings of the related art, and are not interpreted as being ideal or excessively formal meanings unless they are definitely defined in the present specification.

Hereinafter, a fast service discovery method and apparatus in a dynamic resource environment using hierarchical Bloom filters according to an embodiment of the present invention will be described in detail with reference to the attached drawings.

FIG. 1 is a conceptual diagram illustrating typical resource levels (or layers). Referring to FIG. 1, the resource levels are classified into a first level 110, a second level 120, and a third level 130. At the first level 110, resources such as lighting capability, multimedia capability, and security sensing capability resources are located.

At the second level 120, resources such as colored, light on-off, video, audio, crash sensing, and motion sensing resources are located.

At the third level 130, resources such as Red Green Blue (RGB) controllable, YCbCr (Y: luminance component, and Cb and Cr: chrominance components) controllable, on-off, video, Moving Picture Experts Group (MPEG)-3, Free Lossless Audio Codec (FLAG), crash sensing, and burglar motion detection resources are located.

Figure 2:
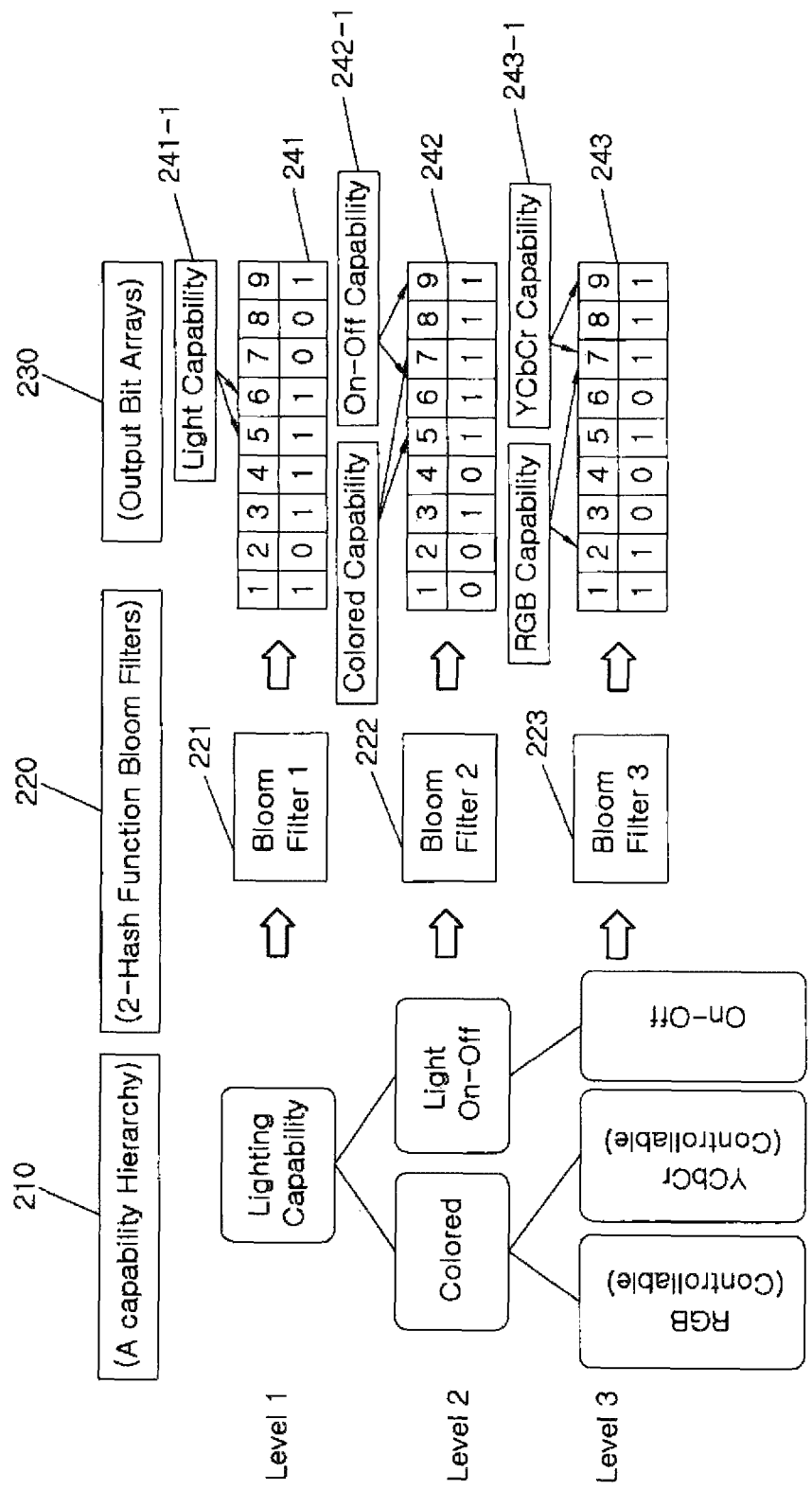
FIG. 2 is a conceptual diagram showing the design of a hierarchical Bloom filter for resource levels according to an embodiment of the present invention.

FIG. 2 is a conceptual diagram showing the design of a hierarchical Bloom filter for resource levels according to an embodiment of the present invention. Referring to FIG. 2, the hierarchical Bloom filter design includes a capability hierarchy component 210, a 2-hash function Bloom filter component 220, and an output bit array component 230.

The capability hierarchy component 210 hierarchically classifies resources into first to third levels. Here, all resources have information about their levels.

The 2-hash function Bloom filter component 220 designs hierarchical Bloom filters for respective pieces of level information.

The output bit array component 230 configures output values transformed by first to third hierarchical Bloom filters 221 to 223 in the form of output bit arrays. A first output bit array 241 is produced by the first hierarchical Bloom filter 221, a second output bit array 242 is produced by the second hierarchical Bloom filter 222, and a third output bit array 243 is produced by the third hierarchical Bloom filter 223.

Light capability resource 241-1 corresponds to the first output bit array 241, colored capability resource and on-off capability resource 242-1 correspond to the second output bit array 242, and RGB capability resource and YCbCr capability resource 243-1 correspond to the third output bit array 243. Here, the number of hierarchical Bloom filters is identical to the number of resource levels.

Of course, a procedure for transforming hash values of resources into coordinates using the first to third hierarchical Bloom filters 221 to 223 is performed. This procedure is represented by the following Equation (1):

$$\text{Resource Capability } A, \vec{V}_A = (\bar{p}_1, \bar{p}_2, \bar{p}_3, \ldots, \bar{p}_k)$$

$$\text{Bloom Filter of level } l, BF_l(A) = (i_{l,1}, i_{l,2}, i_{l,3}, \ldots, i_{l,k})$$

$$D_l = \begin{cases} l = L, & D_l = 0 \\ l < L, & D_l = \sum_{j=l+1}^{L} d_j \end{cases}, \quad d_j = \text{Digit of } BF_j(A) \quad (1)$$

For $$\vec{V}_A, \overline{p}_k = \sum_{l=0}^{L} \{i_{l,k} \times 10^{D_l}\}$$

where A: resource, $BF_l$: hierarchical Bloom filter corresponding to resource level l, $D_l$: the number of digits of the maximum value, of the hash values of the hierarchical Bloom filter corresponding to resource level l, L the lowermost level (number) of resource levels, and $d_j$: digit of $BF_j(A)$.

Figure 3:
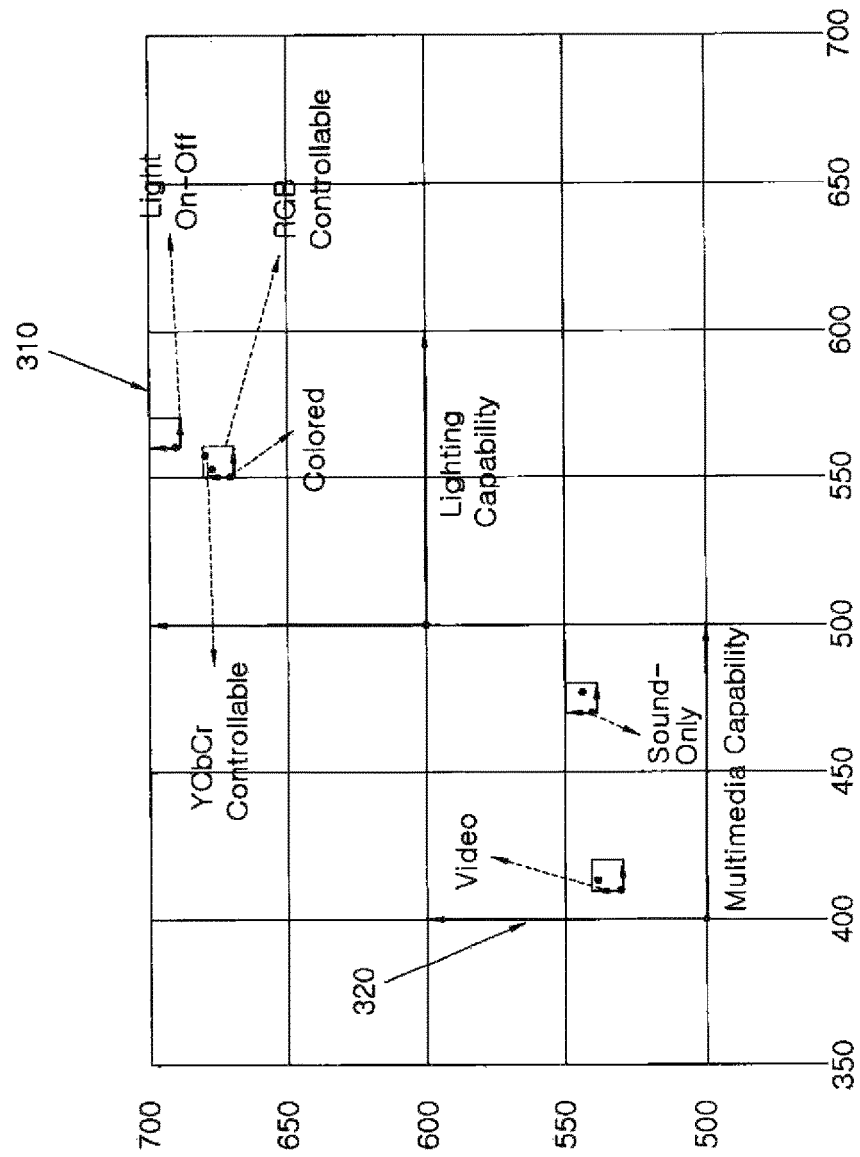
FIG. 3 illustrates an example in which transformed coordinate values are indicated in a resource coordinate system and areas for levels are displayed according to an embodiment of the present invention.

FIG. 3 illustrates an example in which transformed coordinate values are indicated in a resource coordinate system and areas for levels are displayed according to an embodiment of the present invention. Referring to FIG. 3, coordinate values 310 for lighting capability resource and coordinate values 320 for multimedia capability resource are depicted. In addition, in the case of the lighting capability resource 310, colored resource, light on-off resource, YCbCr controllable resource, and Red, Green, Blue (RGB) controllable resource, etc. are expressed by coordinates. Further, in the case of the multimedia capability resource 320, video resource, sound-only resource, etc. are expressed by coordinates.

Figure 4:
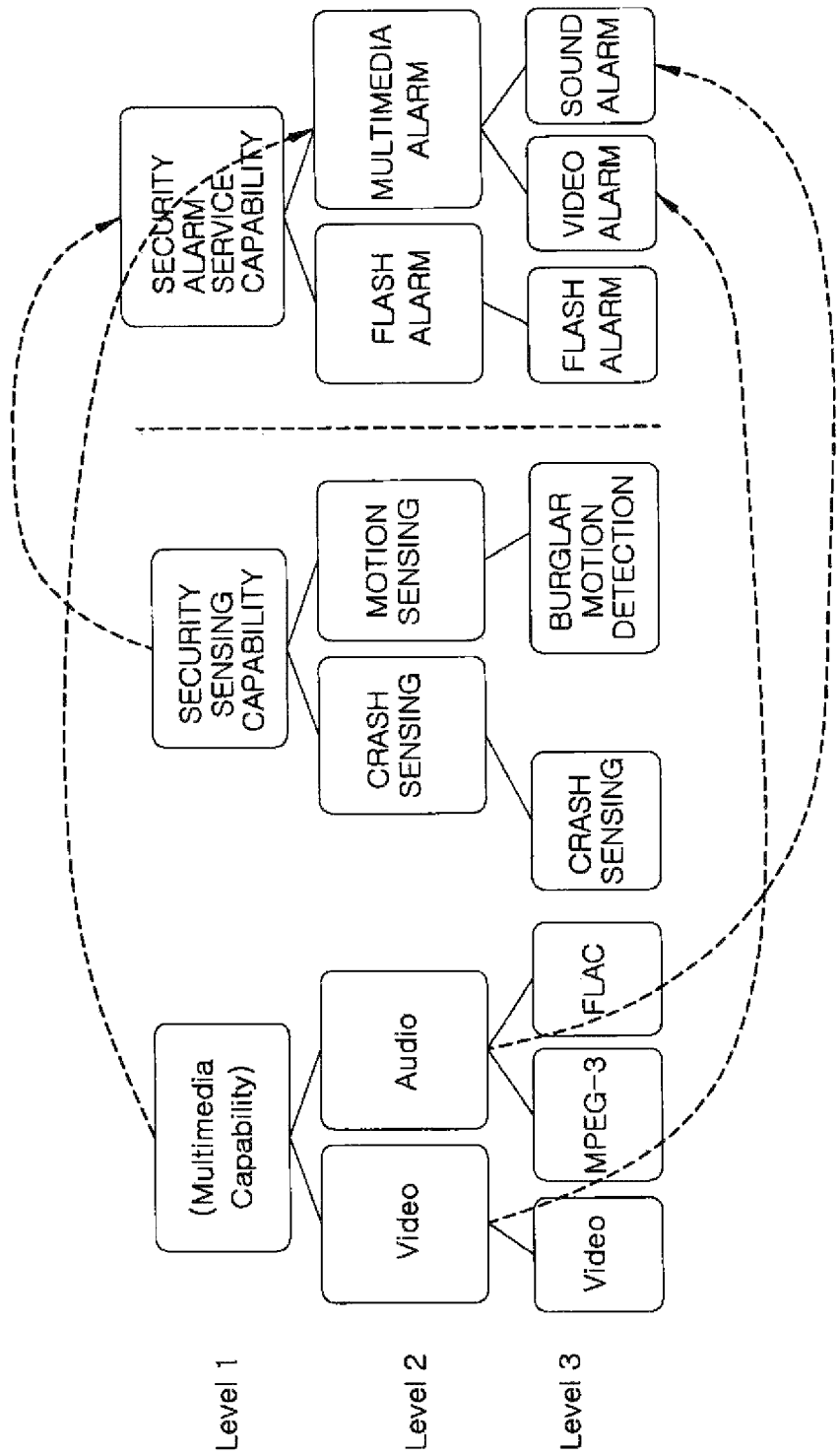
FIG. 4 illustrates an example in which resources are concretely or abstractly specified to execute a service according to an embodiment of the present invention.

FIG. 4 illustrates an example in which resources are concretely or abstractly specified to execute a service according to an embodiment of the present invention. Referring to FIG. 4, a security alarm service is located at a higher level corresponding to level 1, a flash alarm and a multimedia alarm are located at a lower level corresponding to a second level, and a flash alarm, a video alarm, and a sound alarm are located at a lowermost level corresponding to a third level.

Figure 5:
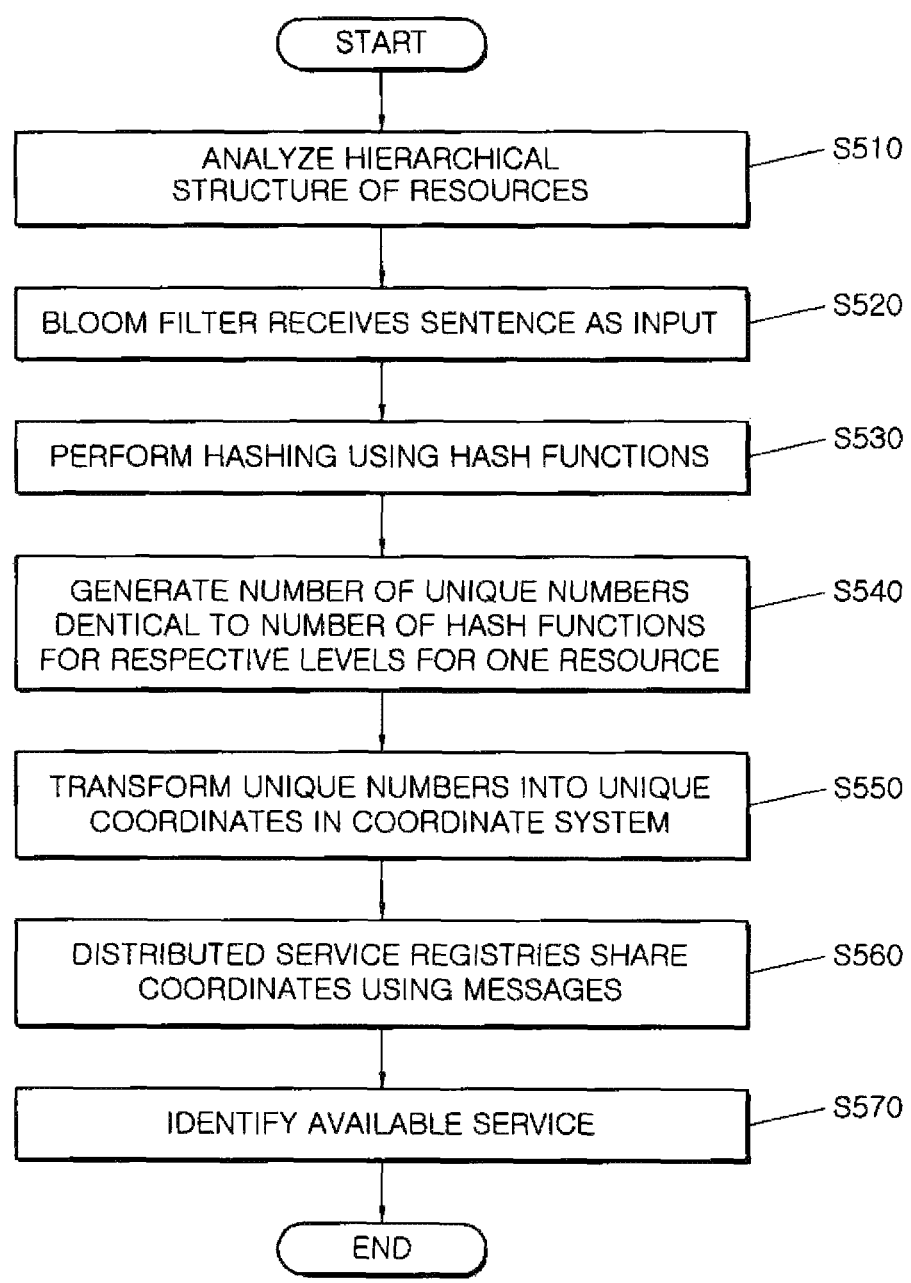
FIG. 5 is a flowchart showing a fast service discovery process in a dynamic resource environment using a hierarchical Bloom filter according to an embodiment of the present invention.

FIG. 5 is a flowchart showing a fast service discovery process in a dynamic resource environment using hierarchical Bloom filters according to an embodiment of the present invention. Referring to FIG. 5, a hierarchical structure of resources defined in the corresponding distributed service execution environment is analyzed at step S510. In addition, resources are hierarchically classified based on levels.

Further, each Bloom filter to be used receives a sentence as input S520. The Bloom filter hashes the input sentence by applying different hash functions of the corresponding hierarchical Bloom filter to the input sentence. The number of hash functions is determined depending on the circumstances. Each hash function generates a unique number for the input sentence. Here, the range of the generated number increases in proportion to the total number of sentences to be hashed by the corresponding hierarchical Bloom filter, and has a range of consecutive numbers starting from 0. In this way, the hierarchical Bloom filter generates a number of unique and different numbers that are identical to the number of hash functions for each sentence input at steps S530 and S540.

The hierarchical Bloom filter generates a number of unique numbers identical to number of hash functions for each level for one resource by using unique Bloom filters for respective levels for the specification and level information of the input resources. Even if different resources belong to the same higher level, they have the same unique numbers for the corresponding level.

Thereafter, the unique numbers generated for respective resources are transformed into unique coordinates in a resource coordinate system at step S550. As such a procedure, the result of each hash function starts from 0, but 1 is added to all values so that the result starts from 1. Further, the hash results of the hierarchical Bloom filter ranging from the uppermost level to the lowermost level are sequentially connected to each other for respective hash functions and then a single number is formed.

The number at a next lower level is connected unchanged to the position subsequent to a number at a higher level. In this case, the number of digits of each number must be fixed at the number of digits of the maximum number falling within the range of numbers that are generated by the corresponding hash function. As a result, for each resource, a number of unique numbers identical to the number of hash functions of the Bloom filter for each resource are generated.

That is, when level information is hashed using Bloom filters, each having two hash functions, two integers are generated for each resource. When level information is hashed using Bloom filters, each having three hash functions, three positive integers are generated for each resource. These numbers may be regarded as coordinate values and may then be expressed in a resource coordinate system (see FIG. 3).

Depending on the number of hash functions, the dimension of the resource coordinate system is determined. Since the higher level is indicated by a higher digit, a lower level may be indicated within a predetermined range of the higher level. Therefore, in the coordinate system, a hierarchical representation of resources is facilitated. The reason for this is that predetermined areas are formed for respective levels.

Multiple distributed service registries transform resources discovered thereby into coordinates in the resource coordinate system at steps S510 to S550, and share the coordinates with each other using messages at step S560. At this time, network traffic may be greatly reduced by sharing only coordinate values rather than sharing a resource specification. After sharing the coordinate values, each distributed service registry quickly identifies an available service using the transformed coordinates in the resource coordinate system S570.

In order to identify the service, the coordinates of resources required to execute the service must be defined in advance. These coordinates must be generated in advance when the distributed service execution environment is created, and may be defined at steps S510 to 550 of the present invention.

By using this information, each distributed service registry may determine whether coordinates corresponding, to the resources required for respective services are present, and may then quickly identify available services. Further, when resources required for services are specified as coordinate values, even substitute resources may also be simply represented via abstract definition.

Abstract definition is intended to specify an allowable range of substitute levels of resources, and is configured to define detailed coordinates up to a required level and specify a substitutive lower level as an integer 0. Therefore, when an available service is identified, if resources belonging to a level other than 0 in the coordinate system are discovered, the corresponding service is determined to be available regardless of the lower level represented by 0 in the resources required by the service.

Detailed components of the present invention, generated according to the above-described step-based task procedure, are described below.

Figure 6:
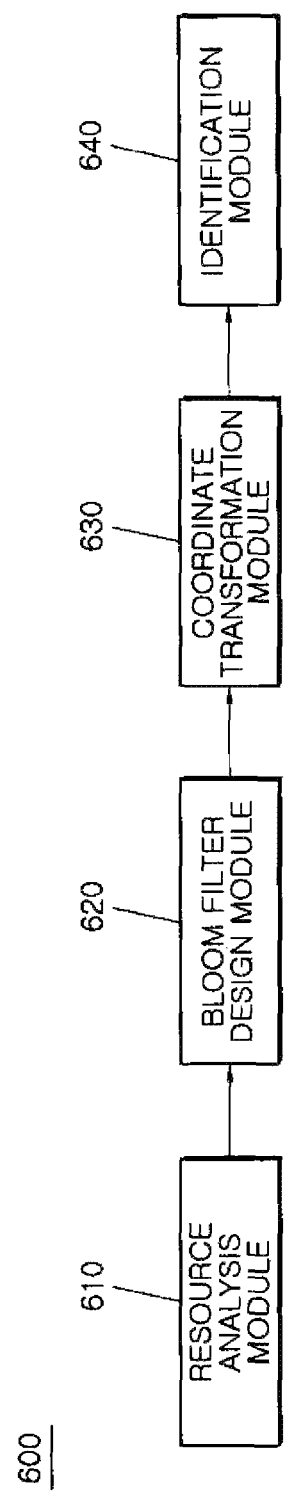
FIG. 6 is a configuration diagram showing a distributed service registry according to an embodiment of the present invention.

FIG. 6 is a configuration diagram showing a distributed service registry according to an embodiment of the present invention. Referring to FIG. 6, a distributed service registry 600 is a fast service discovery apparatus in a dynamic resource environment using hierarchical Bloom filters. The distributed service registry 600 includes a resource analysis module 610 for hierarchically classifying resources based on multiple levels, a Bloom filter design module 620 for designing multiple hierarchical Bloom filters for respective pieces of, level information to respectively correspond to the multiple levels, a coordinate transformation module 630 for transforming the resources into coordinates in a resource coordinate system using the Bloom filters, and an identification module 640 for identifying an available service using the resource coordinate system.

The term "module" described in FIG. 6 denotes a unit by which at least one function or operation is processed, which may be implemented using hardware or software, or a combination of hardware and software.

In a distributed service execution environment, resources required to execute the service are distributed to several positions, and those resources are discovered to detect an available service.

In this environment, the embodiment of the present invention may effectively reduce network traffic that occurs in a message exchange procedure between distributed service registries that share resource information with each other by transforming respective resources into coordinates in the resource coordinate system via the hierarchical Bloom filters, unlike conventional methods.

Further, when identifying a service available at the corresponding time using information about discovered resources, the present invention uses a resource coordinate system in which transformed coordinates are displayed, rather than using a method of increasing a processing time due to the use of a resource specification as in the case of conventional methods, thus making it possible to quickly determine whether resources required by the service are available. By means of this, the present invention may reduce the time required to detect an available service.

The embodiments of the present invention may reduce network traffic occurring in, the procedure for sharing discovered resource information, and may quickly detect an available service, thus promptly coping with even an environmental variation, such as the movement of resources, and enabling the more recent resource and service information to be provided compared to conventional methods. Further, the present invention may configure a distributed service execution environment at relatively better performance, thus obtaining economic profit.

In accordance with the present invention, the time required to identify an available service may be reduced and message traffic occurring in the exchange of messages between service registries may also be reduced, by transforming respective resources into unique coordinates using hierarchical Bloom filters.

Further, in accordance with the present invention, there is an additional advantage in that pieces of information about levels are displayed together in a coordinate system, so that the substitutive range of resources required by service may be defined via coordinates, and only the defined range of coordinates may be searched, and thus it is possible to more quickly and simply determine whether substitute resources are present.

That is, as the most important object of the present invention, the speed at which an available service is identified in a distributed service execution environment may be improved. Furthermore, substitute resources may be quickly detected, thus providing assistance in service execution.

What is claimed is:

1. A fast service discovery method in a dynamic resource environment using hierarchical Bloom filters, comprising:
   (a) when resources are discovered, hierarchically classifying the resources based on multiple levels;
   (b) designing multiple hierarchical Bloom filters for respective pieces of level information to respectively correspond to the multiple levels, and transforming the resources into a resource coordinate system via the Bloom filters; and
   (c) identifying an available service using the resource coordinate system,
   wherein (b) comprises:
   receiving, by each of the multiple hierarchical Bloom filters, a sentence as input; and
   transforming the sentence into the resource coordinate system by hashing the sentence using different hash functions of the corresponding hierarchical Bloom filter, and
   wherein the hashing is configured to transform the resources into coordinate values in the resource coordinate system using the following equation:

Resource Capability $A, \vec{V}_A = (\bar{p}_1, \bar{p}_2, \bar{p}_3, \ldots, \bar{p}_k)$ Bloom Filter of level $l, BF_l(A) = (i_{l,1}, i_{l,2}, i_{l,3}, \ldots, i_{l,k})$ $$D_l = \begin{cases} l = L, & D_l = 0 \\ l < L, & D_l = \sum_{j=l+1}^{L} d_j \end{cases}, \quad d_j = \text{Digit of } BF_j(A)$$

For $$\vec{V}_A, \bar{p}_k = \sum_{l=0}^{L} \{i_{l,k} \times 10^{D_l}\}$$

(where A: resource, $BF_l$: a hierarchical Bloom filter corresponding to resource level l, $D_l$: a number of digits of a maximum value of hash values of the hierarchical Bloom filter corresponding to resource level l, L: a lowermost level (number) of the resource levels, and digit of $BF_j(A)$).

2. The fast service discovery method of claim 1, wherein the resources have information about respective resource levels thereof, and a number of the multiple hierarchical Bloom filters is identical to a number of the resource levels.

3. The fast service discovery method of claim 1, wherein the multiple hierarchical Bloom filters are configured such that a unique Bloom filter is used for each level for specification and level information of the resources, and a number of unique numbers identical to a number of hash functions are generated for each level for one resource.

4. The fast service discovery method of claim 1, wherein each of the multiple hierarchical Bloom filters has a predetermined number of hash functions, and the multiple hierarchical Bloom filters have an identical number of hash functions.

5. The fast service discovery method of claim 1, wherein the coordinate values are transformed into positive integers, with the level information of the resources being included in the coordinate values via hashing, and hash values at all levels for respective types of hash functions form a single number in such a way that a hash value at a lower level is connected to a position subsequent to a hash value at a higher level.

6. The fast service discovery method of claim 1, wherein the resource coordinate system has a dimension corresponding to a number of hash functions, and is configured such that the resources are transformed into coordinate values falling within unique areas depending on the level information and such that resources at an identical level are transformed into coordinate values falling within an identical area.

7. The fast service discovery method of claim 1, wherein respective services require resources at different levels, and the corresponding service is capable of being executed via resources belonging to a higher level regardless of lower levels when only the higher level is specified.

8. A fast service discovery apparatus in a dynamic resource environment using hierarchical Bloom filters, comprising:
   a resource analysis module for, when resources are discovered, hierarchically classifying the resources based on multiple levels;
   a Bloom filter design module for designing multiple hierarchical Bloom filters for respective pieces of level information to respectively correspond to the multiple levels;
   a coordinate transformation module for transforming the resources into a resource coordinate system via the Bloom filters; and
   an identification module for identifying an available service using the resource coordinate system,
   wherein each of the multiple hierarchical Bloom filters receives a sentence as input, and the sentence is transformed into the resource coordinate system by hashing the sentence using different hash functions of the corresponding hierarchical Bloom filter, and
   wherein the hashing is configured to transform the resources into coordinate values in the resource coordinate system using the following equation:

Resource Capability $A, \vec{V}_A = (\bar{p}_1, \bar{p}_2, \bar{p}_3, \ldots, \bar{p}_k)$ Bloom Filter of level $l, BF_l(A) = (i_{l,1}, i_{l,2}, i_{l,3}, \ldots, i_{l,k})$ $$D_l = \begin{cases} l = L, & D_l = 0 \\ l < L, & D_l = \sum_{j=l+1}^{L} d_j \end{cases}, \quad d_j = \text{Digit of } BF_j(A)$$

For $$\vec{V}_A, \bar{p}_k = \sum_{l=0}^{L} \{i_{l,k} \times 10^{D_l}\}$$

(where A: resource, $BF_j$: a hierarchical Bloom filter corresponding to resource level l, $D_j$: a number of digits of a maximum value of hash values of the hierarchical Bloom filter corresponding to resource level l, L: a lowermost level (number) of the resource levels, and $d_j$: digit of $BF_j(A)$).

* * * * *